United States Patent [19]

Cidade

[11] 3,982,102
[45] Sept. 21, 1976

[54] METHOD OF RECORDING BETS IN A LOTTERY AND SELECTING THE WINNERS BY ELECTRONIC COMPUTERS

[76] Inventor: Humberto José De Carvalho Cidade, Avenida Erasmo Braga, No. 277, Rio de Janeiro, Guanabara, Brazil

[22] Filed: Oct. 6, 1971

[21] Appl. No.: 187,050

[30] Foreign Application Priority Data
Oct. 7, 1970   Brazil .................................. 222823

[52] U.S. Cl. ............................................ 235/61.6 E
[51] Int. Cl.² ............................................ G06K 1/00
[58] Field of Search ............ 235/61.12 N, 61.12 R, 235/61.1, 61.6 R, 61.6 E

[56] References Cited
UNITED STATES PATENTS

| | | | |
|---|---|---|---|
| 3,124,674 | 3/1964 | Edwards et al. .................... | 235/61.1 |
| 3,441,714 | 4/1969 | Simjian ........................... | 235/61.6 R |
| 3,602,696 | 8/1971 | Joyce ............................ | 235/61.12 R |
| 3,610,893 | 10/1971 | Clark et al. .................... | 235/61.12 R |

*Primary Examiner*—Daryl W. Cook
*Attorney, Agent, or Firm*—Emory L. Groff, Jr.

[57] ABSTRACT

A method of recording bets in a public lottery comprises transferring data filled in by the bettor on an entry sheet to duplicate punch cards by means of a manual perforating device. The data on the punch cards is recorded by means of computers on magnetic tape and the results of the particular sporting event are recorded on a master punch card. The master punch card is then fed into a computer to select the winners of the contest based upon the previously stored data appearing on the individual punch cards.

1 Claim, 2 Drawing Figures

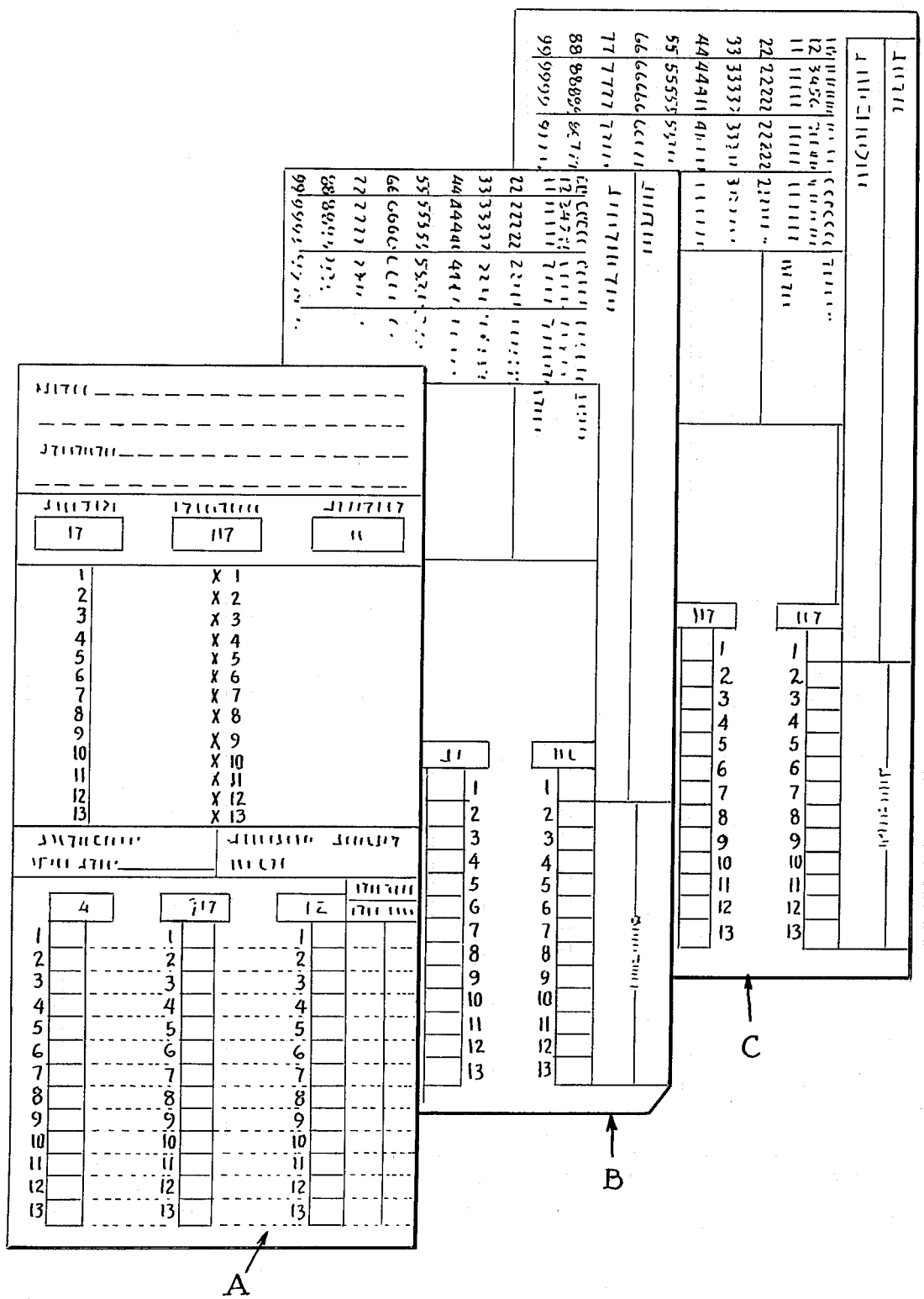

METHOD OF RECORDING BETS IN A LOTTERY AND SELECTING THE WINNERS BY ELECTRONIC COMPUTERS

A contest of predictions regarding sports competitions comprises the totalling of bets made relating to the results of a series of national or international sports events. This type of contest has been adopted in various European countries, under different names. In Italy, for example, it is called "TOTOCALCIO", and in Portugal "TOTOBOLA". In Brazil, it is known as "LOTERIA DEPORTIVA FEDERAL" by the Law Act No. 594, dated May 27, 1969, which established it, regulated by Act No. 66,118, dated Jan. 26, 1970, and considered as a public service, a prerogative of the Nation, to be executed by the Federal Department of Savings.

The systems of conducting lotteries in those countries which have them are similar to each other, but they differ substantially from the system described in the present application, which is very simple and unique. The difference is brought out in the first step, which is the taking of the bet. Electronic methods are used in the system described herein, which utilizes computers, and the taking of the bets is recorded on punch cards of the Hollerith type (international model), which constitutes its principal characteristic.

Other countries do not use an electronic system, with the exception of England, which uses an optical reading system which is completely different from the present system.

The primary object of the present invention is to provide an efficient and accurate system of recording bets placed in a public lottery by means of recording the data on punch cards which are recorded in a central office by means of computers on magnetic tapes.

Other objects will be apparent with reference to the following description and brief description of the drawings, wherein:

FIG. 2 is a fragmentary, composite view of the entry sheet and two computer cards to which the data appearing on the entry sheet is transferred.

Figure 1:
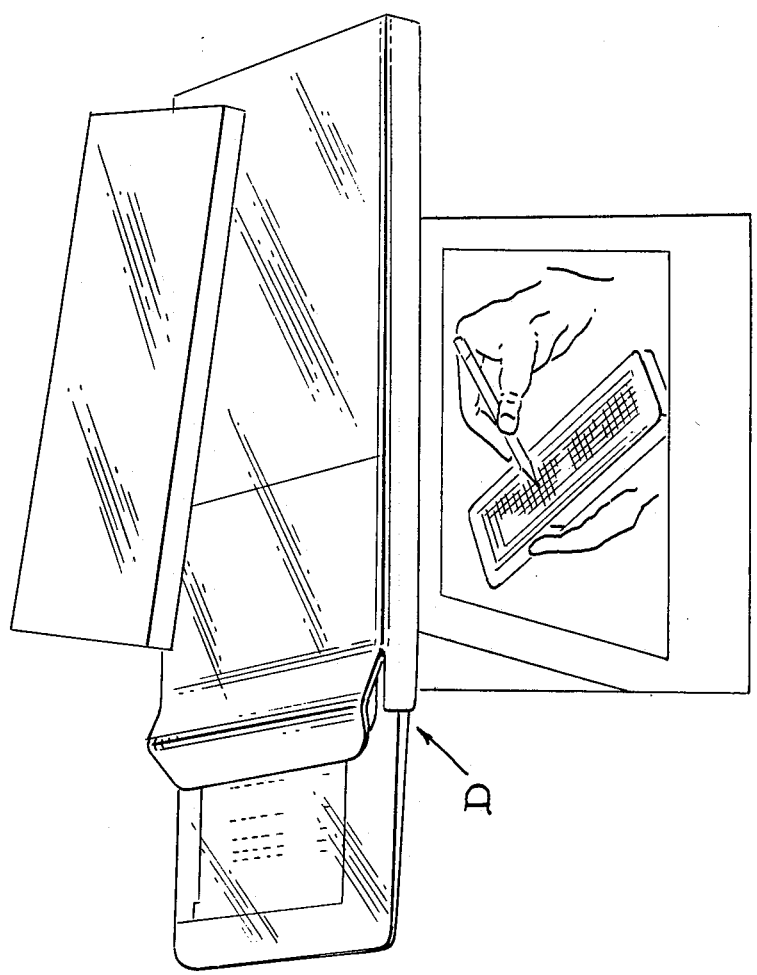
FIG. 1 is a diagrammatic illustration of an entry sheet filled out by the person placing a bet.

The particular form of recording bets according to the present system, which is applicable to the "LOTERIA DEPORTIVE FEDERAL" or to any other sporting event betting competition, consists of the following:

The bettor marks down his predictions on a piece of paper comprising an entry sheet which lists the sporting games included in the contest; also he fills in his name, address, the column indicating the double and triple bets, the space to indicate the number of bets and the amount to be paid, in the manner shown in FIG. 1 of the drawings. In said Figure, the bettor's name is entered in space 1, and his address in space 2. The word "CLUB" is printed at space 3, the word "TIE" at space 4, the word "CLUB" again at space 5. In space 6 there appears the words "NUMBER OF BETS", and at 7 "AMOUNT TO BE PAID". At 8, "PREDICTION", at 9 "DOUBLE" and at 10 "TRIPLE". This paper is placed by the person in charge of recording the bets on top of two punch cards of the Hollerith type adapted to operate in electronic computers, said cards being made in such a manner that the spaces indicating the bets coincide with the spaces of the paper on which the predictions were initially marked, as illustrated in FIG. 2.

In said FIG. 2, A is the list of predictions of the bettor; B is the Hollerith card for the computer, and C is the Hollerith card receipt. As mentioned above, said cards shall contain spaces to mark down the name and address of the bettor, amount received for the bet and authentication thereof. The cards may also contain more spaces reserved for control by the contest organization, such as the bet number, salesman's code number, the state and city, as well as any other data deemed necessary.

Figure 3:
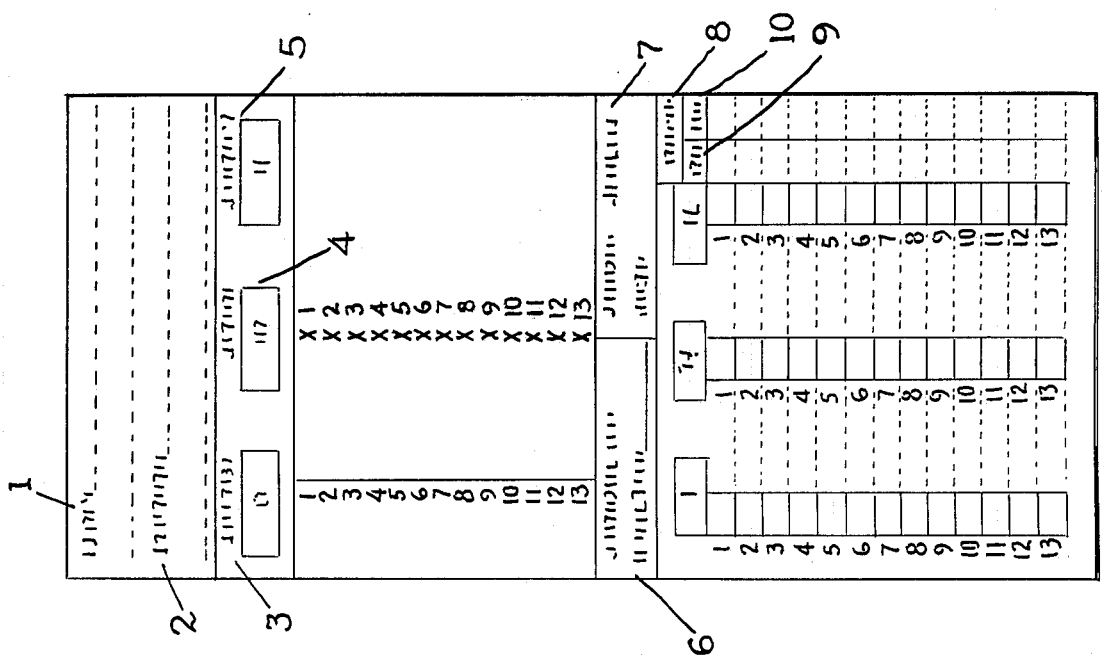
FIG. 3 is a diagrammatic view of a manual perforating device used to transfer the data from the entry sheet to the punch cards.

Arranged in the manner described above, the paper listing the predictions and the Hollerith cards are inserted into a manual, portable, perforating device D, known as the "PORT-A-PUNCH", which is manufactured by IBM and illustrated diagrammatically in FIG. 3. The paper A and cards B and C are then perforated by means of a puncher similar to a pencil (FIG. 3) by the person taking the bets, at the places on the paper A where the bettor marked his predictions, in such a manner that, upon punching, the same hole will also be recorded on the two cards B and C which were placed under the paper A provided with coinciding spaces. The bet taker then fills out the spaces on the punch cards corresponding to the name and address of the bettor, and immediately gives him one of the perforated cards as a receipt for payment of the amount corresponding to his bets, the value of which will have been previously set by the sponsor or by the regulations. The bet taker retains the other punch card.

This other card will subsequently be taken, along with additional cards recording other bets, to a central office, where they are then recorded by means of computers on magnetic tapes, preferably more than two, as a safety measure. After the recording, the tapes containing all of the bets made will be kept in a safe and the cards filed in a safe place.

During the recording, and without the necessity of any other processes, the computer will also store electronically other data necessary for the contest, such as how it was organized, by means of accounting and statistical data, and will indicate the objections and wrong or fraudulent bets.

After the sporting events listed in the program have been held, and they may be weekly, biweekly or monthly, in accordance with the rules, a model or master card is composed from the results and it is inserted into the computer, which can then determine the winners without needing more than one operator. In Spain, for example, 5,800 checkers or card examiners are needed. The result according to the present invention is thus obtained with electronic rapidity and is exempt from material failures of a manual process.

The system described above is therefore simple, fast and economical, as has been proven, and with its undeniable advantages over the other processes, it constitutes an authentically original solution.

It is to be noted that in European betting contests, the program of the sports events is printed in duplicate, the first sheet with the spaces to be filled out being a carbon, so that when the bettor marks down his predictions, he records them also on the second copy.

In the system according to my invention, this does not occur, which simplifies the task of the bettor when writing down his bets.

In the European system, after making the entries on his betting paper, the bettor buys a stamp in the amount corresponding to the value of his bet, sticks it on the first copy, heads for the receiving counter and turns in this first copy. The second copy is then authenticated by machines provided for this purpose, and it remains in his possession as receipt and proof.

The organization running the contest collects this first copy and microfilms it on machines provided for this purpose, which does not occur in my system in which the bets already recorded on a punch card are transferred by the computer on magnetic tapes. After this operation, the microfilms are kept in a safe and the first copy is filed in an appropriate place.

Once the results of the games are known, the officials make out a model result sheet and proceed to compare it manually with the first copies filed, selecting and counting also manually the first copies which have the most accurate predictions and which ultimately designate the winner or winners.

The above verification process which is necessary in the European system, in addition to being tiresome and requiring a considerable number of checkers, 370 in Portugal, for example, has disadvantages in that errors in manual processes tend to be great. Other winners show up frequently after the results have been checked. This is so true that, to solve the problem of this situation, the date for settlement and payment of the winners is extended, so as to deal with the possible appearance of other winners and compare their results with the microfilms.

As we can see, it is obvious that the system of the present invention is much more efficient, rapid, economical and simple, and requires only one person for the verification of the winner or winners of the contest.

By comparison, the present system offers, among others, the following advantages:

a. It avoids having to import machines for the authentication of the bets (there are no domestic machines for same).
b. It avoids having to import machines for the microfilming of the bets.
c. It avoids having to hire specialized foreign staff.
d. It reduces the physical space that would be taken by checkers.
e. It would not be necessary to import any other machinery.
f. Checking of errors, frauds or irregularities before the results of the contest.
g. The verification is totally electronic and therefore reduces the possibility of errors.
h. Greater rapidity in the introduction of the services and in the checking of the bets.
i. Greater simplicity in the making of the bet, as far as the bettor is concerned.

It should be noted, as an observation and without going into details, that if any of the systems presently in use are introduced into Brazil, a minimum period of 24 months would be needed for its introduction, in addition to a large administration with much personnel, without even mentioning the cost of the imported machinery, space needed and specialized labor.

In conclusion, the system described above has specific characteristics, qualities and undeniable advantages over the existing systems. It constitutes a practical solution in modern cybernetics in the field of lotteries where the results of sporting events are predicted by the public.

I claim:

1. A method of recording bets in a public lottery based upon the outcome of one or more sporting events and selecting the winners comprising the steps of:

marking the name and address of the bettor, the number of bets, the amount of the bets and the prediction of the results of said sporting events on an entry sheet containing a list thereof, placing said sheet on top of two Hollerith type punch cards adapted to operate in electronic computers, said punch cards containing bet indicating spaces corresponding to the bet indicating spaces on said sheet, placing the thus arranged sheet and punch cards in a manual perforating device, perforating said sheet and cards by a punching instrument at the spaces on said sheet where the predictions have been marked, marking the name and address of the bettor on said punch cards, for visual use one of said cards being retained by the bettor, the data on the other of said cards being recorded by means of computers on magnetic tapes, composing a master punch card containing the data indicating the results of the particular sporting event or events and.

inserting said master card into a computer to select the winners of the contest based upon previously stored data appearing on the other of said punch cards.

* * * * *